(12) United States Patent
Roth

(10) Patent No.: US 8,646,854 B2
(45) Date of Patent: Feb. 11, 2014

(54) ATTACHMENT PART FOR A CABINET, IN PARTICULAR AN ELECTRICAL SWITCHGEAR CABINET FOR AN ELECTRICAL SERVICE DISTRIBUTION PANEL AND AN ELECTRICAL SWITCHGEAR CABINET

(75) Inventor: Michael Roth, Sasbach (DE)

(73) Assignee: ABB AG, Mannheim (DE)

( * ) Notice: Subject to any disclaimer, the term of this patent is extended or adjusted under 35 U.S.C. 154(b) by 254 days.

(21) Appl. No.: 12/669,892

(22) PCT Filed: Jul. 21, 2008

(86) PCT No.: PCT/EP2008/005967
§ 371 (c)(1),
(2), (4) Date: Jan. 20, 2010

(87) PCT Pub. No.: WO2009/012964
PCT Pub. Date: Jan. 29, 2009

(65) Prior Publication Data
US 2010/0187956 A1 Jul. 29, 2010

(30) Foreign Application Priority Data
Jul. 24, 2007 (DE) .......................... 10 2007 034 514

(51) Int. Cl.
*A47G 29/00* (2006.01)
(52) U.S. Cl.
USPC ....................................................... 312/265.4
(58) Field of Classification Search
USPC .................. 312/257.1, 263–265.6, 223.2
See application file for complete search history.

(56) References Cited

U.S. PATENT DOCUMENTS

| 633,356 | A | * | 9/1899 | Carnahan | 229/122 |
| 1,129,040 | A | * | 2/1915 | McClure | 138/156 |
| 4,115,655 | A | * | 9/1978 | Prentice | 174/368 |
| 4,123,129 | A | * | 10/1978 | Butler | 312/265.3 |
| 4,322,572 | A | * | 3/1982 | Snyder | 174/368 |
| 4,378,137 | A | * | 3/1983 | Gibson et al. | 312/265.3 |
| 4,768,845 | A | * | 9/1988 | Yeh | 312/257.1 |
| 5,777,854 | A | * | 7/1998 | Welch et al. | 361/800 |
| 5,944,439 | A | * | 8/1999 | Ellsworth et al. | 403/231 |
| 6,281,433 | B1 | * | 8/2001 | Decker et al. | 174/394 |
| 6,902,068 | B1 | | 6/2005 | Fontana et al. | |
| 7,047,702 | B1 | * | 5/2006 | Callens et al. | 52/716.1 |
| 2010/0181881 | A1 | * | 7/2010 | Hsu | 312/257.1 |

FOREIGN PATENT DOCUMENTS

| DE | 8504295 U1 | 7/1985 |
| EP | 1251611 A2 | 10/2002 |
| FR | 2702314 A1 | 9/1994 |
| WO | WO 0147080 A1 | 6/2001 |

OTHER PUBLICATIONS

International Search Report for PCT/EP2008/005967 mailed on Apr. 6, 2009.

* cited by examiner

*Primary Examiner* — Darnell Jayne
*Assistant Examiner* — Timothy M Ayres
(74) *Attorney, Agent, or Firm* — Leydig, Voit & Mayer, Ltd.

(57) ABSTRACT

An attachment part for a mechanical connection of a rear wall to a first and a second side wall, a base wall and a ceiling wall of a cabinet includes a plurality of resilient tongues each integrally formed on the attachment part and each having a latching lug, wherein the attachment part can be attached to an inside of the rear wall at each one of four corners of the rear wall at a right angle with the rear wall, and wherein the first and the second side wall, the base wall and the ceiling wall are each firmly latchable to the latching lugs.

9 Claims, 4 Drawing Sheets ial Application No. PCT/EP2008/005967 filed on Jul. 21, 2008, which claims priority to German Application No. DE 10 2007 034 514.5, filed on Jul. 24, 2007. The International Application was published in German on Jan. 29, 2009 as WO 2009/012964 under PCT Article 21 (2).

ATTACHMENT PART FOR A CABINET, IN PARTICULAR AN ELECTRICAL SWITCHGEAR CABINET FOR AN ELECTRICAL SERVICE DISTRIBUTION PANEL AND AN ELECTRICAL SWITCHGEAR CABINET

This is a U.S. National Phase Application under 35 U.S.C. §171 of International Application No. PCT/EP2008/005967 filed on Jul. 21, 2008, which claims priority to German Application No. DE 10 2007 034 514.5, filed on Jul. 24, 2007. The International Application was published in German on Jan. 29, 2009 as WO 2009/012964 under PCT Article 21 (2).

The invention relates to an attachment part for a cabinet, in particular an electrical switchgear cabinet.

BACKGROUND

Switchgear cabinets for electrical service distribution panels of this type have a rear wall, two side walls, a base wall and a ceiling wall, which walls are welded to one another at their edges. A door is fitted to one of the vertical free edges and the interior of the switchgear cabinet is accessible by means of said door.

The disadvantage of this structural solution is that the switchgear cabinet itself can no longer be dismantled but has to be produced in the factory, this being unfavorable in terms of storage and transportation.

SUMMARY OF THE INVENTION

An aspect of the present invention is to provide an attachment part for a cabinet, in particular an electrical switchgear cabinet, of the type mentioned in the introduction with which the cabinet can be dismantled for transportation purposes and furthermore can be easily assembled.

According to the invention, in each case an elongate attachment part can accordingly be attached to the inside of the rear wall at the four corners of said rear wall in a manner oriented at right angles to said rear wall, with resilient tongues with latching lugs being integrally formed on said attachment part, it being possible for the side walls, the base wall and the ceiling wall to be firmly latched to said latching lugs.

A significant portion of the assembly work is carried out by fixing the attachment parts to the rear wall; in order to add to and finish the cabinet, in particular the switchgear cabinet, it is only necessary to firmly latch the side walls, the base wall and the ceiling wall to the attachment part. A significant advantage is that the switchgear cabinet is composed of components which can be releasably connected to one another. Therefore, storage can be improved because the space requirement is lower. In addition, the outlay on assembly is lower than, for example, those switchgear cabinets which are welded together.

One advantageous refinement of the invention has the effect that the attachment part has an L shape which is formed at right angles to the longitudinal extent in cross section, and in that the tongues are integrally formed on the outer faces of the limbs at right angles to the outer faces by way of the latching lugs.

In order that the required and convertible space can be reduced, the outer faces of the limbs in each case have a groove which runs in the longitudinal direction of the attachment part; the tongues are then integrally formed on one of the side walls of the groove parallel to this side wall.

A further embodiment of the invention is provides an electrical switchgear cabinet in which the attachment part can be employed.

The side walls, the base wall and the ceiling wall accordingly have, at their side edges which adjoin the attachment parts, inwardly bent edges which can latch in behind the latching lugs on the tongues. As a result, assembly of the side walls, the base wall and the ceiling wall is considerably simplified by said walls being fitted to the attachment parts from the outside and being pushed behind the latching lugs by way of their bent edges, with tools not being required for this purpose.

In a further advantageous embodiment, second bent edges which form an L shape are provided on the bent edges, said second bent edges forming, with the bent edges, an approximately U-shaped side wall groove, into which two grooves an outer corner part of which the length corresponds to the length of the attachment part can be inserted in the direction of its longitudinal extent and that of the component can be inserted in the direction of the rear wall, with strip-like projections being provided on the outer corner part, said strip-like projections fitting into the side wall grooves for bracing the side walls, the base wall and the ceiling wall.

An advantageous refinement of the electrical switchgear cabinet has the effect that soft-elastic seal lips or sealing lips are fitted to the outer corner part, said seal lips or sealing lips being arranged at the limb ends and projecting in the direction of the limbs. In this case, the sealing lips bear against the side walls, against the ceiling wall and the base wall, as a result of which protection in accordance with IP 54 is achieved.

Further advantageous refinements of the invention can be found in the further dependent claims.

The invention, further advantageous refinements and improvements as well as further advantages will be explained and described in greater detail with reference to the drawings which schematically illustrate one exemplary embodiment of the invention in different working steps.

DETAILED DESCRIPTION

Figure 1:
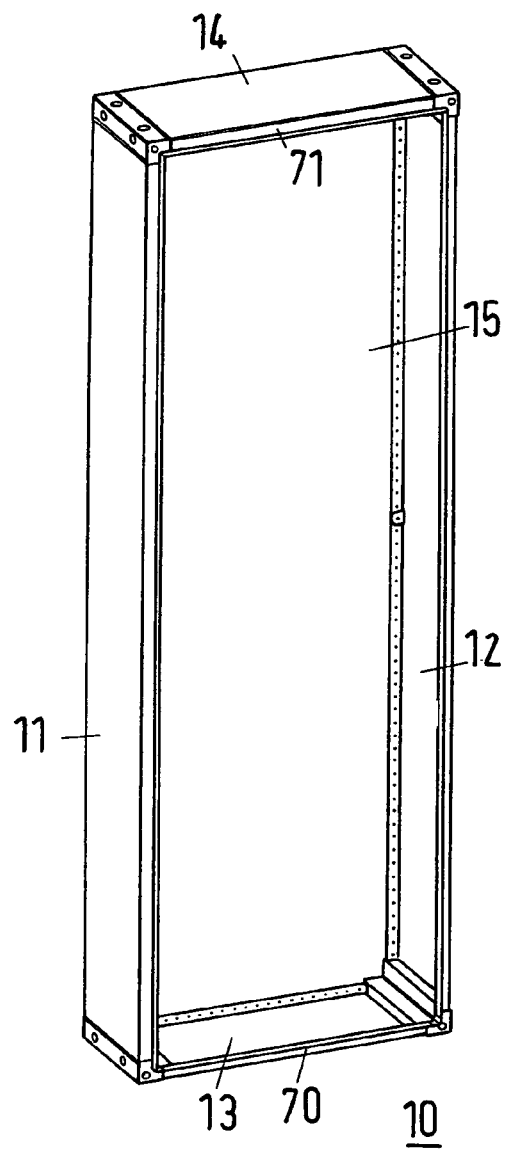
FIG. 1 shows an internal view into a completely assembled switchgear cabinet.

Reference will now be made to FIG. 1.

A switchgear cabinet 10 comprises two side walls 11 and 12 and also a base wall 13, a ceiling wall 14 and a rear wall 15, with the switchgear cabinet being substantially completely assembled. By way of example, crossbars in the form of a top-hat rail for latching on electrical installation equipment are to be installed in the switchgear cabinet. Said crossbars and a front door, for closing the switchgear cabinet, are not illustrated because they are not important to the invention.

Figure 2:
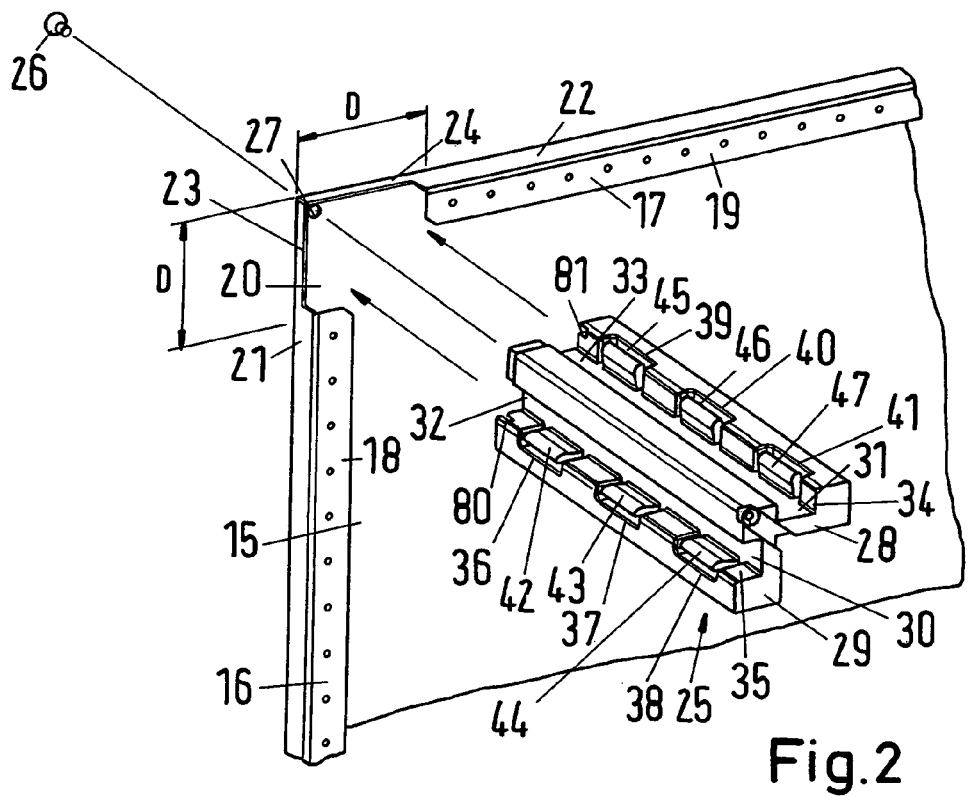
FIG. 2 shows the association of an attachment part to the rear wall before fixing.

Reference will now be made to FIG. 2.

FIG. 2 shows a perspective view of a corner region of a switchgear cabinet, with only part of the rear wall 15 being shown. The rear wall has, at its edges, bent edges 16, 17 which are bent inward in an L-shaped manner and of which the free limbs 18, 19 run parallel to the inner face of the side wall. A cutout 20 is provided in the region of the corner of the bent edges 16, 17 and the limbs 18, 19, and therefore the free limbs 18, 19 end at a distance D in front of the corner edge. The free limbs 18, 19 adjoin bars 21 and 22 which run at right angles to the side wall, with the cutout 20 also comprising the bars 21 and 22, and therefore in each case a strip-like protrusion 23, 24 is formed in the region of the corners, the height of said protrusion, measured from the inner face of the side wall, preferably being less than half the height of the bars 21 and 22.

An attachment part 25 is attached to the inner face in the region of the corner of the cutout 20, with the attachment part 25 being mounted on the inner face of the rear wall 15 by way of its end face (not visible), and with the peripheral contour of the attachment part 25 being installed at right angles to the longitudinal extent of the cutout 20. Attachment is performed by means of an attachment screw 26 which passes through a passage hole 27 in the rear wall 15 and is screwed into the end face of the attachment part 25.

The attachment part 25 has, in cross section, an approximate L shape with two limbs 28 and 29 which run at right angles to one another, with in each case a U-shaped groove 30, 31 which runs in the longitudinal direction of the attachment part 25 being provided on the outer faces of the limbs 28, 29. The groove base 32 of the two grooves 30, 31 runs, like the groove base 33, in the direction of the longitudinal extent of the limbs 28 and 29. The groove base 32 and the groove base 33 run, like the limbs 28, 29, at right angles to one another. Three further cutouts 36, 37, 38 and also 39, 40 and 41, in which cutouts in each case a resilient tongue 42, 43 and 44 and also 45, 46 and 47 is arranged, which tongues each protrude at right angles to the groove base 32 and 33 respectively, are arranged on the side walls 34, 35 of the grooves 31 and 30 which are placed at the free ends of the limbs 28, 29. The tongues 42, 43, 44 on the limb 29 accordingly project in the opposite direction to the limb 28, and the tongues 45, 46 and 47 project in the opposite direction to the limb 29, and are in each case integrally formed on the groove base 32, 33 at right angles to said groove base. Latching lugs 42a, 43a, 44a and 45a, 46a, 47a, which project into the associated groove 30, 31 in order to provide latching, are integrally formed at the end of the tongues 42, 43, 44 and 45, 46, 47. Slots 80, 81 into which the protrusions 23 and 24 engage in the assembled state in order to guide the attachment part 25, as shown in FIG. 3, are made on the end face of the attachment part 25 which adjoins the rear wall 15.

Figure 3:
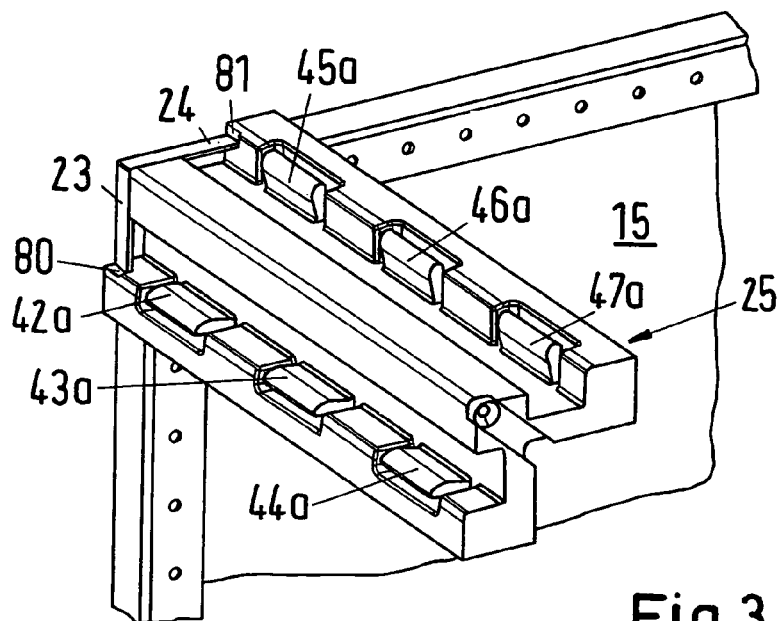
FIG. 3 shows the arrangement according to FIG. 2 after the attachment part is fixed to the rear wall.

FIG. 3 shows the arrangement of the attachment part 25 on the rear wall in an illustration which is slightly enlarged compared to FIG. 2.

Figure 4:
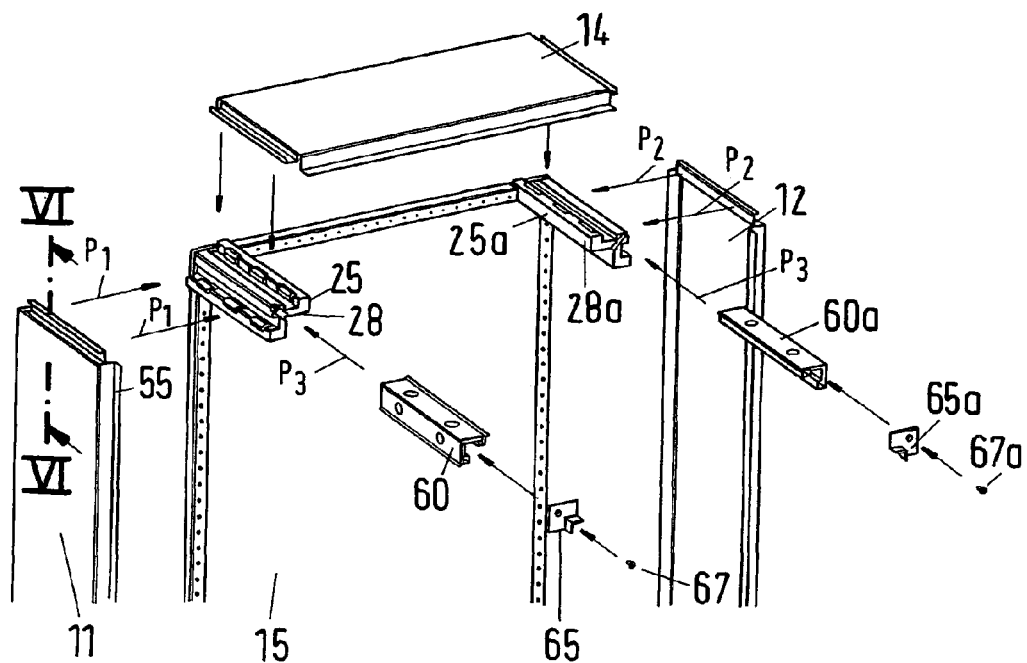
FIG. 4 shows a perspective view of the upper part of a switchgear cabinet according to the invention, with only the two upper attachment parts being fixed to the rear wall.

FIG. 4 shows the upper section of a switchgear cabinet in a further assembly step with the rear wall 15, the side walls 11 and 12 and also the ceiling wall 14. The attachment parts 25, 25a are fixed to the rear wall 15 at the illustrated and visible corners, with the limbs 28, 28a facing one another.

Figure 6:
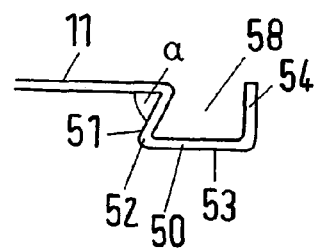
FIG. 6 shows a cross-sectional view according to section line VI-VI of FIG. 4.

At the edges which adjoin the attachment parts 25, 25a and run horizontally at the upper and lower ends, the side walls 11, 12 and the ceiling wall 14 have second bent edges 50 which are bent in the direction of the inner face, see FIG. 6, with the bar 51, which is directly adjacent to the inner face of the side wall 11, of the second bent edge 50 forming an angle α of less than 90° with the inner face, as a result of which a latching-in lug 52 is formed between the bar 51 and a further bar 53 which runs parallel to the inner face of the side wall 11. A limb 54 which is at right angles to the bar 53 and of which the end edge lies approximately in the plane of the side wall 11 is located at the free end of the bar 53. The second bent edges 50 are formed in such a way that they fit into the grooves 30, 31.

By way of the latching-in lug 52, the side wall 11 is pushed in direction P1 toward the attachment part 25 and the side wall 12 is pushed in the opposite direction P2 toward the attachment part 25a until the latching-in lug 52 engages in behind the latching lugs 42a, 43a, 44a. The ceiling wall 14 has a second bent edge of identical design to that of the side wall 11 and the corresponding latching-in lug of this second bent edge then engages behind the latching lugs 45a, 46a and 47a.

Further bent edges are provided at the longitudinal edges, which run at right angles, of the side walls 11, 12 and also of the base wall and ceiling wall 14, limbs (only the limb 55 of the side wall 11 is illustrated) which run at right angles to the rear wall 15 being provided at said bent edges, it being possible for further carrier elements or a front door to be fitted to said limbs if desired.

Figure 5:
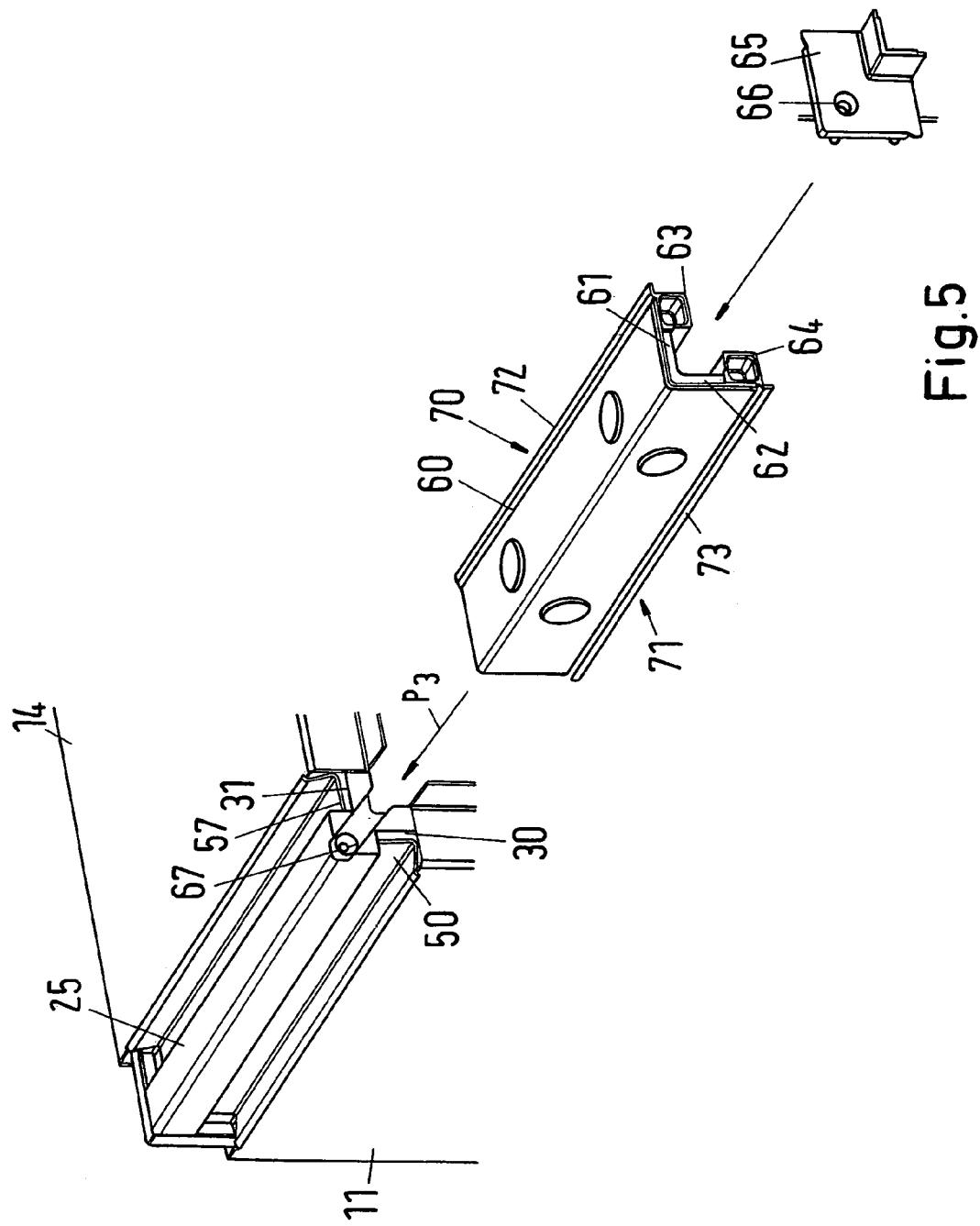
FIG. 5 shows a perspective view of a corner region of a switchgear cabinet with a latched-on side wall and a latched-on ceiling wall and an outer corner part before insertion into the corresponding grooves.

As can be seen in FIG. 2, each attachment part has two grooves 30, 31 into which the bent edges 50 of the side walls 11 and of the ceiling wall 14 engage (only attachment part 25 can be seen here). A receiving groove 58 (see FIG. 6) into which an outer corner part 60 can be inserted is formed by the bar 51, the further bar 53 and the limb 54. The outer corner part 60 is illustrated in FIG. 5. Said outer corner part has an L-shaped cross section with a first outer corner part limb 61 and a second outer corner part limb 62, which limbs run at right angles to one another and which limbs have, on their inner faces, strip projections 63 and 64 which can be inserted into the receiving grooves 58 in arrow direction P3. The side wall 11 is braced to the ceiling wall 14, the ceiling wall 14 is braced to the side wall 12 and, inversely, the side walls 11 and 12 are braced to the base wall by way of this plug-on part 60 or outer corner part 60.

The attachment part 25 and the outer corner part 60 are complemented by a covering cap 65 which has a plate-like shape and a screw which can be screwed through a passage hole 66 and can be screwed to or into a threaded bore 67 in the attachment part 25, so that the switchgear cabinet as illustrated in FIG. 1 results when assembly is complete. The fact that bent beam edges 70 and 71, which are complemented by bent edges 55, are provided on the base wall in the front region, like on the ceiling wall, is merely noted in passing.

As can be seen in FIGS. 1 to 6, the attachment parts 25, 25a, like the outer corner parts 60, 60a, have a length which corresponds to the depth of the switchgear cabinet, or to the distance between the front face and the rear wall.

The particular advantage of the invention is that, in order to produce the switchgear cabinet according to FIG. 1, only attachment work of the attachment parts 25, 25a, latching work of the side walls 11, 12 and of the ceiling wall 14 (and also of the base wall of course), insertion of in each case an outer corner part 60, 60a into the corresponding receiving grooves 58 in the side walls 11, 12 and the ceiling wall 14 (like the base wall) is required; the assembly work by attaching the covering caps 65, 65a to the attachment parts 25, 25a by means of the screws 67, 67a is stopped. A further significant advantage of the invention is that the switchgear cabinet can be dismantled, this reducing the space requirement for storage and the space requirement during transportation.

At its limb ends 70, 71, the outer corner part 60 has sealing lips 72, 73 comprising an elastic material which are placed against the side panels 11, 12, the base wall 15 and the ceiling wall 14, as a result of which the switchgear cabinet meets the requirements of standard IP 54.

The outer corner part 60 and sealing lips 72, 73 are produced using a two-component technique.

LIST OF REFERENCE SYMBOLS

10 Switchgear cabinet
11 Side wall
12 Side wall
13 Base wall
14 Ceiling wall
15 Rear wall
16 Bent edge
17 Bent edge
18 Free limb
19 Free limb
20 Cutout
21 Bar
22 Bar
23 Protrusion
24 Protrusion
25 Attachment part
26 Attachment screw
27 Passage hole
28 Limb
29 Limb
30 Groove
31 Groove
32 Groove base
33 Groove base
34 Side wall
35 Side wall
36 Further cutout
37 Further cutout
38 Further cutout
39 Further cutout
40 Further cutout
41 Further cutout
42 Tongues
43 Tongues
44 Tongues
45 Tongues
46 Tongues
47 Tongues
42a Latching lug
43a Latching lug
44a Latching lug
45a Latching lug
46a Latching lug
47a Latching lug
50 Second bent edge
51 Bar
52 Latching-in lug
53 Further bar
54 Limb
58 Receiving groove
60 Outer corner part
61 First outer corner part limb
62 Second outer corner part limb
63 Strip projection
64 Strip projection
65 Covering cap
66 Passage hole
67 Threaded bore
70 Bent beam edge
71 Bent beam edge

The invention claimed is:

1. An attachment part for a mechanical connection of a rear wall to a first and a second side wall, a base wall and a ceiling wall of an electrical switchgear cabinet comprising:
   two limbs formed in an L-shape, each limb including an inner face facing inward with respect to the L-shape and an outer face facing outward with respect to the L-shape such that the outer faces are disposed at a reflex angle; and
   a plurality of resilient tongues each integrally formed in one piece with the attachment part and extending, each resilient tongue extending outward from the outer face of a respective one of the limbs in a respective direction and including a latching lug projecting from the resilient tongue in a direction transverse to the direction of extension of the resilient tongue, wherein the attachment part can be attached to an inside of the rear wall at each one of four corners of the rear wall at a right angle with the rear wall, and wherein the first and the second side wall, the base wall and the ceiling wall are each firmly latchable to the latching lugs.

2. The attachment part as recited in claim 1, wherein each of the plurality of resilient tongues form a right angle with the outer face of the respective limb.

3. The attachment part as recited in claim 2, wherein the outer face of each of the two limbs each includes a groove running in a longitudinal direction of the attachment part, each groove having a first and a second side wall and a groove base, wherein each of the plurality of tongues are integrally formed on the first groove side wall in each groove.

4. The attachment part as recited in claim 3, wherein the first and the second groove side walls each include a plurality of cutouts disposed opposite the corner edge of one of the limbs or adjacent to an end edge of one of the limbs, wherein each of the plurality of resilient tongues are disposed in one of the plurality of cutouts, and wherein the plurality of tongues are integrally formed on a base of the groove.

5. An electrical switchgear cabinet comprising:
   a rear wall;
   a first and a second side wall each having a side edge and an inwardly bent second bent edge adjacent to the side edge;
   a base wall having a side edge and an inwardly bent second bent edge adjacent to the side edge;
   a ceiling wall having a side edge and an inwardly bent second bent edge adjacent to the side edge; and
   at least one attachment part for a mechanical connection of the rear wall to the first and the second side walls, the base wall and the ceiling wall, each attachment part having a plurality of resilient tongues each integrally formed in one piece with the at least one attachment part, each resilient tongue extending from the attachment part in a respective direction and including a latching lug projecting from the resilient tongue in a direction transverse to the direction of extension of the resilient tongue, wherein the attachment part is attached to an inside of the rear wall at each one of four corners of the rear wall at a right angle with the rear wall, and wherein the first and the second side, walls, the base wall and the ceiling wall are each firmly latched to the latching lugs, and wherein each one of the side edges adjoins a respective attachment part and each one of the second bent edges is latched so as to engage the latching lugs.

6. The electrical switchgear cabinet as recited in claim 5, wherein the at least one attachment part includes at least one longitudinally running groove and wherein each one of the second bent edges includes a further bent edge forming an L-shape, the further bent edge fitting into the at least one longitudinally running groove so as to form a U-shaped receiving groove at the second bent edge.

7. The electrical switchgear cabinet as recited in claim 6, further comprising an outer corner part for the at least one attachment part and having a strip projection, wherein a length of the outer corner part corresponds to a length of the at least one attachment part, and wherein the strip projection is insertable into the at least one longitudinally running groove so as to brace the first and the second side wall, the base wall and the ceiling wall.

8. The electrical switchgear cabinet as recited in claim 7, wherein the outer corner part includes two limbs disposed in a L-shape, and wherein the strip projection is fitted to an inner face of one of the two limbs.

9. The electrical switchgear cabinet as recited in claim 8, wherein the outer corner part includes soft-elastic sealing lips disposed on an edge of each of the two limbs and projecting in a direction of the two limbs and configured to seal against the first and the second side walls, the ceiling wall, and the base wall in an assembled state.

* * * * *